United States Patent
Fischer et al.

(10) Patent No.: US 11,579,594 B2
(45) Date of Patent: Feb. 14, 2023

(54) METHOD AND ENGINEERING SYSTEM FOR MODIFYING A PROGRAM OF AN INDUSTRIAL AUTOMATION COMPONENT

(71) Applicant: Siemens Aktiengesellschaft, Munich (DE)

(72) Inventors: Christian Fischer, Hersbruck (DE); Michael Frank, Buttenheim (DE); Lothar Pfahlmann, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/612,594

(22) PCT Filed: Apr. 22, 2020

(86) PCT No.: PCT/EP2020/061137
§ 371 (c)(1),
(2) Date: Nov. 19, 2021

(87) PCT Pub. No.: WO2020/233924
PCT Pub. Date: Nov. 26, 2020

(65) Prior Publication Data
US 2022/0206477 A1    Jun. 30, 2022

(30) Foreign Application Priority Data
May 22, 2019   (EP) .................................... 19175904

(51) Int. Cl.
*G05B 19/418*  (2006.01)
*G06F 8/65*   (2018.01)

(52) U.S. Cl.
CPC . *G05B 19/41835* (2013.01); *G05B 19/41845* (2013.01); *G06F 8/65* (2013.01);
(Continued)

(58) Field of Classification Search
USPC ......................................................... 717/168
See application file for complete search history.

(56) References Cited

U.S. PATENT DOCUMENTS 5,854,932 A    12/1998  Mariani et al.
8,635,309 B2 *  1/2014  Berthiaume ............ G06F 16/17
                                                717/172

(Continued)

FOREIGN PATENT DOCUMENTS

CN      106528086    3/2017
EP        1205842    5/2002

*Primary Examiner* — Qing Chen
*Assistant Examiner* — Clint Thatcher
(74) *Attorney, Agent, or Firm* — Cozen O'Connor

(57) ABSTRACT

A method for modifying a program of an industrial automation component, wherein the program includes a plurality of program elements, where the program is structured in units, a unit includes a group of program elements and can include both published program elements having an interface that can be referenced by the program elements of other units and unpublished program elements, and where a checksum is calculated and is assigned to the unit using the interfaces, such that if at least one program element of the version of the unit stored in the engineering system is modified, then the modified checksum is compared with the previous checksum version present in the automation component, and only the modified unit is transferred if the checksums match such that consistency of the program is maintained and the software updateable more quickly.

16 Claims, 3 Drawing Sheets

(52) U.S. Cl.
CPC .............. *G05B 2219/23199* (2013.01); *G05B 2219/25157* (2013.01); *G05B 2219/25235* (2013.01); *G05B 2219/33003* (2013.01)

(56) References Cited

U.S. PATENT DOCUMENTS

| | | | |
|---|---|---|---|
| 2005/0159932 A1* | 7/2005 | Thurner | G06Q 10/06 703/2 |
| 2008/0208365 A1* | 8/2008 | Grgic | G06F 8/65 717/135 |
| 2012/0079470 A1 | 3/2012 | Fukatsu | |
| 2018/0081669 A1* | 3/2018 | Becker | H04L 63/123 |
| 2018/0089337 A1* | 3/2018 | Uppunda | G06F 8/71 |
| 2018/0357058 A1* | 12/2018 | Malaspina | H04L 67/34 |
| 2018/0359144 A1* | 12/2018 | Malaspina | H04L 41/082 |
| 2020/0103843 A1* | 4/2020 | Stump | G06F 8/35 |

* cited by examiner

METHOD AND ENGINEERING SYSTEM FOR MODIFYING A PROGRAM OF AN INDUSTRIAL AUTOMATION COMPONENT

CROSS-REFERENCE TO RELATED APPLICATIONS

This is a U.S. national stage of application No. PCT/EP2020/061137 filed 22 Apr. 2020. Priority is claimed on European Application No. 19175904.2 filed 22 May 2019, the content of which is incorporated herein by reference in its entirety.

BACKGROUND OF THE INVENTION

1. Field of the Invention

The invention relates to a method for modifying a program of an industrial automation component and to an engineering system for modifying the program of the industrial automation component.

2. Description of the Related Art

Industrial automation components, in particular programmable logic controllers, are used for automating production systems and for automating process-engineering installations. This regularly involves sensor values being processed by a running program and converted into commands for actuators, as a result of which a control task can be performed.

The programs (control programs) for modern industrial automation components (programmable logic controller (PLC)) are highly complex and therefore consist of a multiplicity of program elements. Such program elements may be, for example, function modules, function blocks or similar units, which are often taken from libraries, e.g., module libraries, and then added to an executable program using a programming tool (the engineering system) when a program is produced. An automation task has often been created in an engineering system or in a multiplicity of engineering systems (multi-user systems) as a "project", which comprises all facets, such as hardware planning, software programming, programming of the operating and observation devices (human-machine interface (HMI)). The automation program (program, for short) is then also compiled from such a project, transferred to the target, i.e., the industrial automation component, and executed thereon.

As mentioned, modern programs for automation components consist of a multiplicity of program elements. The programs are so complex that multiple program developers at multiple workstations, i.e., with multiple engineering systems, often work on a project simultaneously. Programs are also developed further and modified while they are in productive use. It is therefore advantageous, in the event of modifications, not always to produce the entire program again, transfer it to the automation component again and (something that would result in the system being stopped in the meantime) restart it, but rather to transfer only modified program elements to the target again (delta download) and to use them there to update the program, often even while operation is ongoing.

The program elements of a program for automation components have dependencies among one another. This means that individual program elements reference other program elements, i.e., call and use them at runtime. Conversely, individual program elements are also accordingly referenced, i.e., also called themselves, by others. The referencing involves accessing the "interface" of the respective program elements, where the interface is thus the interface for calling and using a program element.

Problems can arise in particular if multiple workers work on the program of one and the same industrial automation component (PLC) simultaneously, because the risk of competing and uncoordinated modifications is then particularly high. In particular, modifications to the interfaces of program elements often lead to inconsistent states of the controller or of automation components. In such a case, the controller can be put into the "stop" state without this being foreseeable, and can then even cause damage to a process-engineering installation or a production installation.

It is therefore a requirement of modern automation systems, i.e., of both industrial automation components as such and of engineering systems, to ensure the consistency of programs of the automation components in the event of partial updates, while making sure that performance is impaired as little as possible.

Various approaches are known for solving this problem. As such, there are strategies that do not actually prevent a user from producing an inconsistent state on the automation component. However, by way of example, a piece of firmware of the automation component performs a consistency checking step before newly loaded program elements are started up, and takes the automation component to a stop status (emergency stop) in the event of an error, albeit without prior warning. Although this often prevents further damage, there is naturally a production downtime as a result of the control device (automation component) having been taken out of operation.

Another strategy is to use the engineering system as a responsible location for consistency and consistency checking by synchronizing current modifications that users have made in the engineering system in the copy of the project that is stored there (offline project) with modifications that other users have made in the meantime to the program that is already present on the controller. This is often performed by first transferring all modified program elements (objects) that have been modified on the automation component in the meantime to the engineering system (upload). The "offline project" has then been updated, which means that a consistency check can be performed via the engineering system. Although this largely prevents sudden shutdowns and therefore improves runtime performance, it leads to restrictions on the use of the engineering systems because the frequent synchronization and the associated upload of software is complex and the performance of the engineering, of the automation component and of the network is adversely affected. In short, the strategy just outlined shifts the problem of synchronization from the execution environment of the automation component to the engineering systems, but does not improve it overall.

The publication EP 3 299 956 A1—Schuster "VERFAHREN UND ANORDNUNG ZUR AKTUALISIERUNG EINES COMPUTERPROGRAMMS" describes the comparison of two versions of a computer program on the basis of respectively formed checksums in order to avoid unnecessary updates, where the respective formation of the checksums preceded by non-functional program elements are filtered out of each of the versions, and the non-functional program elements therefore are not included in the checksums.

DE 11 2011 103 308 T5—Fukatsu "Verfahren, System and Programm" discloses the practice of checking, prior to the update of an operating system, identification of the relevant parts of the operating system based on version information prior to the update.

EP 1 205 842 A2—Venkatesan et al. "Minimum Delta Generator for Program Binaries" describes the comparison of program fragments of an installed program with the fragments of a piece of update software via a hash value such that only modified fragments are updated.

U.S. Pat. No. 5,854,932 A—Mariani et al. "Compiler and Method for Avoiding Unnecessary Recompilation" describes the consideration of approximate dependencies instead of absolute dependencies for mutual dependencies of program elements when updating an operating system.

SUMMARY OF THE INVENTION

It is an object of the present invention to ensure the consistency of a program for an industrial automation component in the event of modification of individual objects or program elements without losses of performance both in the automation component and in the engineering system.

A central concept of the way in which the invention achieves this object is by dividing a software project for an industrial automation component into easily manageable parts, i.e., "units". The unit advantageously holds not only program codes but also private data, which are preferably encrypted. The program code is also preferably encrypted. A software unit can comprise both internal (non-public) and published (public) software elements, where only the published (public) software elements can be addressed and used from "outside", i.e., by other (external) units and program elements. Therefore, only the public software elements, i.e., the published software elements, shape the externally visible interface of a unit. A unit (software unit) can therefore reference other units to use the published software elements of the referenced units. Unpublished software elements (non-public) can be addressed or referenced only within the same unit, on the other hand, i.e., have no externally (outside the individual unit) visible interface. The concept of the units and the then considered interfaces of the published (public) program elements allows the dependencies between the individual units to be controlled, such that inconsistencies when modifying individual program elements can actually be avoided in advance.

A unit is generally a loadable (download and upload) unit. Units are individually manageable elements for a block publication, with independent control over dependencies ("unit references"), and suitable for structuring the software into (reusable) units.

While it is a generally known practice to structure software solutions into individual software components for the widest variety of purposes, for example, for simplification, for reusing individual modules, for hiding internal structures and for separate distribution and download of individual components, the units considered here allow the dependencies between the individual units to be clearly understood and taken into consideration when managing the downloads, as a result of an analysis and management (explained in more detail later on) of the software interfaces of the published program elements contained. This renders fine-grained updates more secure and means that they can be limited to the units that are required for the update, which reduces the volumes of data to be transferred. At the same time, the management of the interfaces of the units that is described here allows the number of units that need to be uploaded in order to update a project on the engineering system to be restricted to those whose interface addressed by other units has changed in the meantime or that reference an interface of other units that has changed in the meantime.

In connection with automation engineering and in particular the aspect of distribution of software (deployment), this means that users of an engineering system can then transfer individual units, i.e., specific program modules that usually fall into the area of responsibility of a software engineer (units can be used in order to delimit areas of responsibility—particularly for startup), to a controller and in particular to an industrial automation component, the units probably having defined dependencies, in particular mutual or unilateral referencing, with respect to other units both in the offline project and with respect to the situation already present on the automation component. This avoids the need for all program elements that have changed on the automation component in the meantime to be uploaded to the "offline project" on the engineering system in order to make decisions about the consistency of the modified program of the automation component. This operation could possibly also have a disruptive effect on the work of the relevant software engineer if the uploaded parts do not fall into his area of responsibility ("his" units). Instead, the decision about consistency and the measures to be taken in order to maintain consistency is rather tied to the modifications to the public interfaces of the units. Consequently, the volume of data needing to be uploaded from the automation component to the engineering systems on a regular basis for the purpose of consistency management decreases the optimization of the number of program elements to be transferred to the automation component (download) continuing to speed up integration into the existing program (delta download and delta compile), which can significantly speed up the overall workflow.

The object of the invention particularly achieved by an engineering system and by a method for modifying a program of an industrial automation component in accordance with the invention, where the program consists of a plurality of program elements, and where the program is modified by transferring modified program elements and program elements that are dependent thereon from an engineering system to the automation component. At least part of the program is structured into units, where a unit comprises a group of program elements, and where a unit can comprise both published program elements and unpublished program elements. Published modules of a unit can be used by modules of another unit as soon as the using unit references the offering unit. Unpublished modules cannot be used by other units. The interfaces of the published program elements of each unit are used to form a checksum and to associate said checksum with the unit in each case, where a modification to at least one published program element results in the current checksum being declared invalid and recalculated for the next compile/download and then, on the engineering system, the checksum of the thus modified unit being compared with the checksum of the previous version of this unit that is present on the automation component, and where, in the event of the checksums matching, only the modified unit is transferred from the engineering system to the automation component, and otherwise all other units that reference the modified unit are also transferred to the automation component in their respective current version of the engineering system.

The dependencies are checked in two directions from a modified or selected unit. The referenced units, which are preferably listed in a relation editor, are checked in a first direction and the referencing units are checked in a second direction.

The unit(s) originally modified or selected by the user is/are always "downloaded" to the target system regardless of modifications to the checksum(s), which is what the user naturally wants. Those other units that the user has not explicitly selected but that the system has recognized as dependent (in both directions) are additionally updated. The use of a simple value, i.e., the checksum, to characterize the published interface of a unit and the thus simplified calculation of the dependencies between the individual units allow a user to use the engineering system to maintain the consistency of a program of an industrial automation component and at the same time effect a comparably fast update for the software by transferring comparatively few, i.e., only the required, units for the entire project.

It is also an object of the invention to provide an engineering system including a processor and memory for modifying a program of an industrial automation component that utilizes the above-described method, where the program consists of a plurality of program elements, where the engineering system is configured to modify the program by transferring modified program elements and program elements that are dependent thereon to the automation component. At least part of the program is structured in units, where a unit comprises a group of program elements, and where a unit can comprise both published program elements having an interface referenced or referenceable by the program elements of other units and unpublished program elements having an interface referenced or referenceable only within the same unit, where the interfaces of the published program elements of each unit are used to form a checksum and to associate the checksum with the unit in each case, where a modification to at least one program element of the version of a unit that is stored on the engineering system results in the checksum of the thus modified unit being compared with the checksum of the previous version of this unit that is present on the automation component, and where, in the event of the checksums matching, only the modified unit is transferred from the engineering system to the automation component, and otherwise all other units that reference the modified unit are also transferred to the automation component in their respective current version of the engineering system. An engineering system configured in this way can be used to attain the advantages that have already been discussed on the basis of the method.

Advantageously, transfer of the unit is preceded by the checksums of the referenceable interfaces of other units referenced by the modified unit that are present on the automation component being transferred to the engineering system and compared there with the checksums of the applicable versions from these versions of the units that are present on the engineering system, where, in the event of a difference, the units having the differing checksums are loaded from the automation component to the engineering system, consistency of the referencing is restored there, and then all affected units are transferred to the automation component. The same advantageously also applies to the units on the automation component that reference the modified unit. A recursion of these operations is thus used to detect and make all required adjustments that result from the modification of an interface of a published program element.

Advantageously, the program element used is a function module, a function or another functional unit of an automation program.

In one advantageous embodiment, the checksum utilized is a hash value, a digital fingerprint or another modification-sensitive indicator of the interface parameters of the referenceable interfaces of the published program elements of a unit.

The reusability of program code is simplified by virtue of the program elements of the program for the industrial automation component being subdivided into units, where the subdivision is made on the basis of functional criteria. As a result, the program elements that are required for a specific functionality of the program are combined into one or more units.

Smaller modifications to a project are implemented more easily and more quickly if the association between the program elements and the units is reconfigured, where the reconfiguration decreases the number of references that exist between the units. The units are thus "tailored" afresh and in an optimized manner. This step can be performed at the same time as the strategy according to which the units are functionally subdivided, as a result of which a number of units are provided for a specific functionality, each unit needing to use or reveal as few external, public references as possible.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention and, at the same time, of the arrangement according to the invention, or the engineering system, is explained below with reference to the drawings, in which.

DETAILED DESCRIPTION OF THE EXEMPLARY EMBODIMENTS

Figure 1:
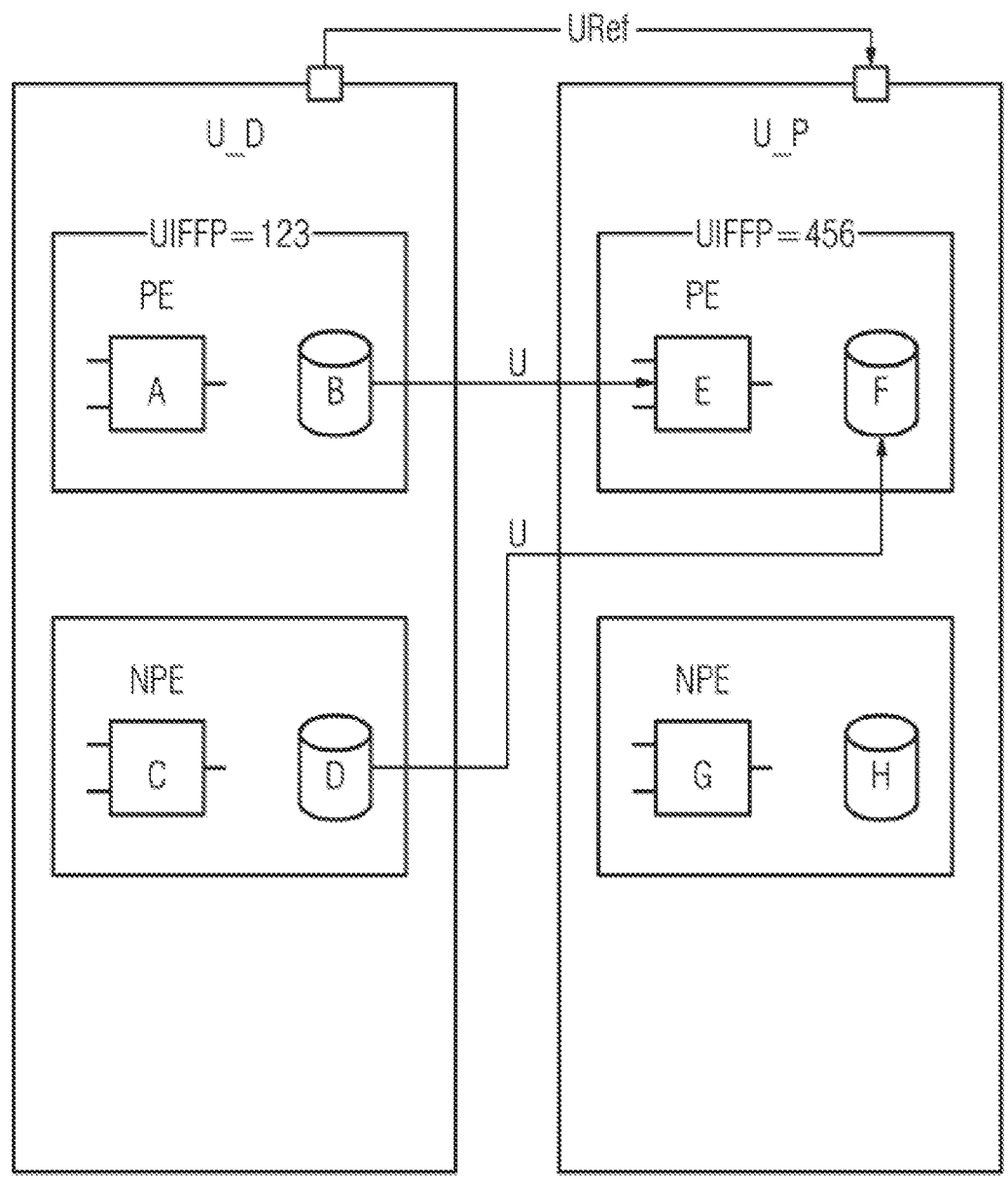
FIG. 1 shows units with program elements in accordance with the invention, where one of the units is referenced by the other.

FIG. 1 shows two units U_D, U_P, for example, the unit U_D for a drilling operation (drill) and the unit U_P for a specific method step (process).

The unit U_D references the unit U_P, this being symbolized by the arrow with the reference sign URef. Various program elements A, . . . , H are arranged in the units U_D, U_P, where the program elements A, B, E, F are published program elements (public elements (PE)) and the program elements C, D, G, H are unpublished program elements (non-public elements (NPE)). The program elements PE published by the units U_P and U_D are also referenceable, i.e., usable or addressable, by program elements that do not belong to the individual unit. Unpublished program elements NPE are usable or referenceable only within the same unit. The term "relation" is sometimes also used instead of "reference" for the relationship between modules that are in a use relationship. In general, the program elements can be executable program code, such as program blocks, routines and/or subroutines, but also data or data modules, variables (tags), and/or interfaces to input and output hardware ("IO interfaces").

In accordance with the exemplary embodiment, the program elements B, D of the unit U_D use the published program elements E, F of the other unit U_P. This is depicted by arrows with the reference sign U (uses).

A checksum UIFFP (software-unit interface fingerprint) is formed in each of the units U_D, U_P by using the characteristics of the interfaces of the published program elements A, B, on the one hand, and E, F, on the other; this value is 123 for the unit U_D in the initial case and 456 for the unit U_P in the initial case. This checksum changes whenever something changes functionally about the access (software interface) by the program elements A, B, on the one hand, or E, F, on the other, represented in the checksum. This means that as soon as an interface of a published program element is modified such that a change ensues therefrom at the using or referencing location, a different checksum is obtained.

The units U_D, U_P explained for FIG. 1 also form the basis for the explanations regarding FIG. 2 discussed below.

Figure 2:
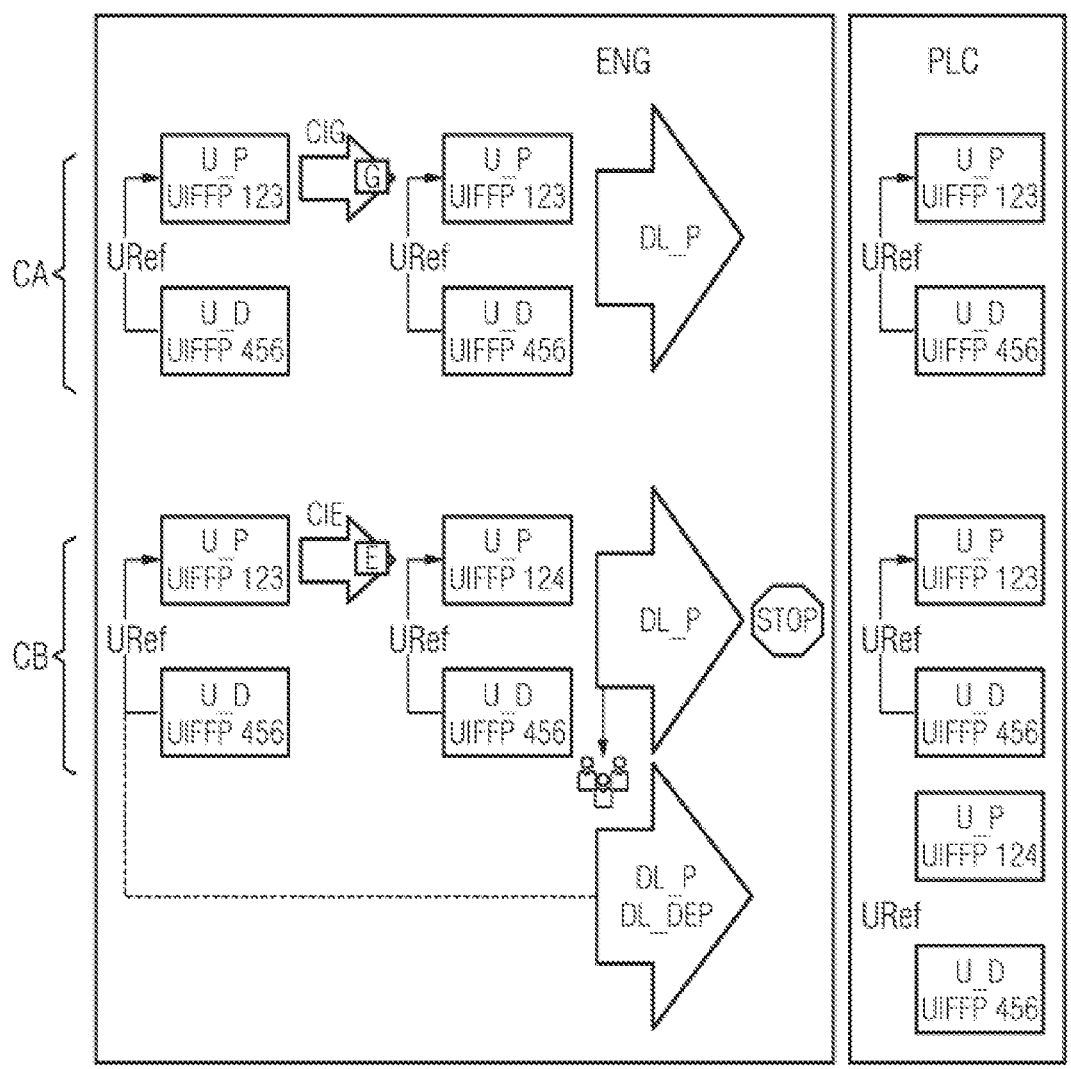
FIG. 2 shows a first and a second case of modifications to the interfaces of program elements of the units and the applicable consequences for the update for an automation component in accordance with the invention.

FIG. 2 shows the units U_D, U_P already known from FIG. 1. Two different cases CA, CB are used to explain a respective modification to one of the program elements and the ensuing consequences for the partial download of the units from the engineering system ENG to an automation component PLC.

In the first case CA (change A), a step (change interface G (CIG)) involves the interface of the program element G of the unit U_P being modified. The program element G is an unpublished program element that is used only within the unit U_P. Accordingly, the check values (fingerprints) UIFFP of the unit U_P do not change. If an update to the program on the automation component PLC is now initiated by virtue of the user selecting a unit (here: unit U_P), in which he has made the modification, and wanting to load it onto the PLC (download), then a first step involves the check values UIFFP of the versions of the units U_P, U_D that are present on the automation component PLC being loaded into the engineering system ENG and stored at this location. These check values UIFFP from the "online project", i.e., the project on the automation component PLC, are compared with the check values UIFFP of the "offline versions" ("offline project") in the editor or program memory of the engineering system. Since only an unpublished program element has changed in the unit U_P, the program element having no influence on the check value UIFFP 456, the engineering system ENG decides that it is enough to transfer the modified and selected unit U_P to the automation component PLC and to start it there without endangering the consistency on the target system.

In the second case CB, the offline project on the engineering system ENG makes a modification to the program element E of the unit U_P in a work step (change interface of element E (CIE)), this modification also relating to the "interface" of the program element E. The check value (fingerprint) UIFFP of the unit U_P therefore changes from 123 to 124.

The situation now arises that the version of the unit U_P that is processed on the engineering system has the check value 124. In the online project, however, the state of which is depicted in the middle of the block PLC in the figure, the unit U_P still has the "old" interface with the checksum 123. Here, the user also selects the unit U_P for download. When the update for the software of the automation component PLC is initiated, the checksums UIFFP are now also again retrieved from the automation component PLC and stored in a dedicated memory area of the engineering system ENG. A comparison of the checksums of the online project and the offline project now reveals the discrepancy between the checksums UIFFP of the two versions of the unit U_P.

Therefore, the system now proposes to the user that a download with dependencies DL_DEP needs to be performed. He has no choice (the engineering system initially prevents the download of the selected unit here) in order to avoid impending inconsistency on the PLC. The user thus must abort the first attempt at the download using 'cancel' and initiate a 'download with dependencies' on the same unit U_P. The user query is shown symbolically in FIG. 2 and can also be dispensed with in another embodiment. This means that not only is the modified unit U_P in its new version transferred to the automation component PLC, but also those units (in this case: the unit U_D) that reference the modified unit U_P, or use published program elements of this unit U_P. Thus, not only does a download DL_P of the unit U_P occur but also a download DL_DEP, i.e., a download of the dependencies. Accordingly, both units U_P, U_D are transferred to the automation component PLC. Consequently, the lower part of the block PLC in FIG. 2 shows that the unit U_P is now stored with the new check value or checksum 124. The check value or the checksum UIFFP of the unit U_D has not changed, however.

The recursion of the method then begins, here. Although the unit U_D has not been explicitly selected by the user for the download, it has been added to the download by the engineering system as being necessary. The same checking mechanism is now applied for this unit U_D added by the system, and possibly even more units than deemed necessary for an update, depending on the change state of the target system (PLC) and depending on the unit reference links in the offline project.

It is therefore possible to maintain the consistency of the software on an automation component even if multiple people work on a project offline and modifications of a competing nature have been used in the meantime. On the other hand, the size of the software to be transferred can still be kept as small as possible, this being achieved by virtue of it being necessary to transfer only such units as were either modified themselves or else access a modified interface of a program element of another unit.

Figure 3:
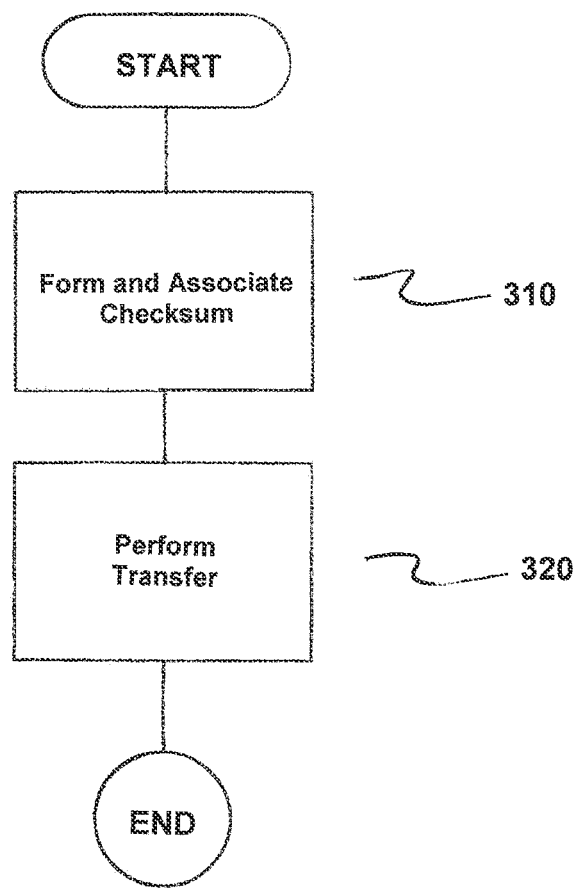
FIG. 3 is a flowchart of the method in accordance with the invention.

FIG. 3 is a flowchart of the method for modifying a program of an industrial automation component, where the program consists of a plurality of program elements A, . . . , H, the program is modified by transferring modified program elements A, . . . , H and program elements A, . . . , H that are dependent thereon from an engineering system ENG to the automation component, at least part of the program being structured in units U_D, U_P, a unit comprising a group of program elements A, . . . , H, where a unit U_D, U_P can additionally comprise both published program elements PE; A, B, E, F, each having an interface referenced by the program elements of other units U_D, U_P, and where unpublished program elements NPE; C, D, G, H, each have an interface referenced only within the same unit.

The method comprises forming a checksum UIFFP based on characteristics of the interfaces of the published program elements PE; A, B, E, F of each unit U_D, U_P and associating the checksum with the unit U_D, U_P in each case such that a modification to at least one program element A, . . . , H of a version of a unit U_D, U_P that is stored on the engineering system results in a checksum UIFFP of the thus modified unit U_D, U_P being compared with the checksum UIFFP of a previous version of this unit U_D, U_P that is present on the automation component, as indicated in step 310.

Next, only the modified unit U_D, U_P is transferred from the engineering system ENG to the automation component in an event the checksums UIFFP match, otherwise all other units U_D, U_P that reference the modified unit U_D, U_P are transferred to the automation component in their respective current version of the engineering system ENG, as indicated in step 320.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for modifying a program of an industrial automation component, the program consisting of a plurality of program elements, the program being modified by transferring modified program elements and program elements which are dependent thereon from an engineering system to the automation component, at least part of the program being structured in units, a unit comprising a group of program elements, a unit being additionally comprisable of both published program elements, each having an interface referenced byte program elements of other units, and unpublished program elements, each having an interface referenced only within the same unit, the method comprising:
forming a checksum based on characteristics of the interfaces of the published program elements of each unit and associating said checksum with the unit in each case such that a modification to at least one program element of a version of a unit which is stored on the engineering system results in a checksum of the thus modified unit being compared with the checksum of a previous version of this unit which is present on the automation component, and transferring only the modified unit from the engineering system to the automation component in an event the checksums match, otherwise transferring all other units which reference the modified unit to the automation component in their respective current version of the engineering system.

2. The method as claimed in claim 1, wherein transfer of the unit is preceded by the checksums of referenceable interfaces of other units referenced by the modified unit which are present on the automation component being transferred to the engineering system and compared there with the checksums of the applicable versions from these versions of the units that are present on the engineering system; and
wherein, in the event of a difference, units having the differing checksums are loaded from the automation component to the engineering system, consistency of the referencing is restored there, and all affected units are then transferred to the automation component.

3. The method as claimed in claim 1, wherein each the program element utilized comprises one of a function module, a function or another functional unit of an automation program.

4. The method as claimed in claim 2, wherein each the program element utilized comprises one of a function module, a function or another functional unit of an automation program.

5. The method as claimed in claim 1, wherein the checksum utilized comprises one of a hash value, a digital fingerprint or another modification-sensitive indicator of the interface parameters of the referenceable interfaces of the published program elements of a unit.

6. The method as claimed in claim 1, wherein the program elements of the program for the industrial automation component are subdivided into units; and wherein the subdivision occurs based on functional criteria such that the program elements which are required for a specific functionality of the program are combined into one or more units.

7. The method as claimed in claim 1, further comprising:
reconfiguring the association between the program elements and the units;
wherein the reconfiguration decreases a number of references which exist between the units by associating program elements which each reference one another with the same units.

8. An engineering system for modifying a program of an industrial automation component, the program consisting of a plurality of program elements, comprising:
a processor; and
memory;
wherein the engineering system is configured to modify the program by transferring modified program elements and program elements which are dependent thereon to the automation component;
wherein at least part of the program is structured in units, wherein a unit comprises a group of program elements, a unit additionally being comprisable of both published program elements, each having an interface referenceable by the program elements of other units, and unpublished program elements, each having an interface referenceable only within the same unit;
wherein the engineering system is further configured to utilize characteristics of interfaces of the published program elements of each unit to form a checksum and to associate said formed checksum with the unit in each case;
wherein a modification to at least one program element of a version of a unit which is stored on the engineering system results in the checksum of the thus modified unit being compared with the checksum of the previous version of this unit which is present on the automation component; and
wherein, in an event the checksums match, only the modified unit is transferred from the engineering system to the automation component, otherwise all other units which reference the modified unit are also transferred to the automation component in their respective current version of the engineering system.

9. The engineering system as claimed in claim 8, wherein transfer of the unit is preceded by checksums of referenceable interfaces of other units referenced by the modified unit which are present on the automation component being transferred to the engineering system and compared there with checksums of applicable versions from these versions of the units which are present on the engineering system; and wherein, in an event of a difference, units having differing checksums are loaded from the automation component to the engineering system, consistency of the referencing is restored there, and all affected units are subsequently transferred to the automation component.

10. The engineering system as claimed in claim 8, wherein a program element comprises one of a function module, a function or another functional unit of an automation program.

11. The engineering system as claimed in claim 9, wherein a program element comprises one of a function module, a function or another functional unit of an automation program.

12. The engineering system as claimed in claim 8, wherein a checksum comprises one of a hash value, a digital fingerprint or another modification-sensitive indicator of the interface parameters of the referenceable interfaces of the published program elements of a unit.

13. The engineering system as claimed in claim 9, wherein a checksum comprises one of a hash value, a digital fingerprint or another modification-sensitive indicator of the interface parameters of the referenceable interfaces of the published program elements of a unit.

14. The engineering system as claimed in claim 10, wherein a checksum comprises one of a hash value, a digital fingerprint or another modification-sensitive indicator of the interface parameters of the referenceable interfaces of the published program elements of a unit.

15. The engineering system as claimed in patent claim 8, wherein program elements of the program for the industrial automation component are subdivided into units; and wherein the subdivision occurs based on functional criteria such that the program elements required for a specific functionality of the program are combined into one or more units.

16. The engineering system as claimed in claim 8, wherein the association between the program elements and the units are reconfigurable; and wherein the reconfiguration decreases a number of references which exist between the units by associating program elements which each reference one another with the same units.

* * * * *